(12) United States Patent
Bottome et al.

(10) Patent No.: US 9,410,431 B2
(45) Date of Patent: Aug. 9, 2016

(54) NOSE CONE ASSEMBLY

(75) Inventors: Kristofer J. Bottome, Nottingham (GB); Paul Mason, Derby (GB); Eric P. Ravey, Diseworth (GB)

(73) Assignee: ROLLS-ROYCE PLC, London (GB)

( * ) Notice: Subject to any disclaimer, the term of this patent is extended or adjusted under 35 U.S.C. 154(b) by 823 days.

(21) Appl. No.: 13/290,225

(22) Filed: Nov. 7, 2011

(65) Prior Publication Data

US 2012/0134843 A1 May 31, 2012

(30) Foreign Application Priority Data

Nov. 30, 2010 (GB) .................................. 1020230.7

(51) Int. Cl.
*F01D 5/06* (2006.01)
*F02C 7/04* (2006.01)

(52) U.S. Cl.
CPC . *F01D 5/066* (2013.01); *F02C 7/04* (2013.01); *Y02T 50/672* (2013.01); *Y02T 50/673* (2013.01)

(58) Field of Classification Search
CPC ....... B64C 11/14; F01D 25/243; F03D 1/065; F03D 1/0666; F03D 1/0691
USPC .................. 416/93 R, 94, 245, 500, 245 R
See application file for complete search history.

(56) References Cited

U.S. PATENT DOCUMENTS

| 1,730,742 | A | | 10/1929 | Nelson | |
|---|---|---|---|---|---|
| 2,297,226 | A | | 9/1942 | Muller-Keuth et al. | |
| 3,990,814 | A | * | 11/1976 | Leone | 416/245 R |
| 4,863,354 | A | * | 9/1989 | Asselin et al. | 416/245 R |
| 5,833,435 | A | * | 11/1998 | Smith | 416/94 |
| 6,416,280 | B1 | | 7/2002 | Forrester et al. | |
| 6,447,255 | B1 | * | 9/2002 | Bagnall et al. | 416/245 R |
| 6,561,763 | B2 | * | 5/2003 | Breakwell | 416/94 |

(Continued)

FOREIGN PATENT DOCUMENTS

| EP | 1 016 588 A2 | 7/2000 |
|---|---|---|
| EP | 2 096 029 A2 | 9/2009 |

(Continued)

OTHER PUBLICATIONS

Mar. 22, 2011 Search Report issued in British Patent Application No. GB1020230.7.

(Continued)

*Primary Examiner* — Sean J Younger
(74) *Attorney, Agent, or Firm* — Oliff PLC

(57) ABSTRACT

A nose cone assembly is provided comprising a nose cone 104, a support ring 106 on which the nose cone 104 is mounted, and an insulating layer 110 disposed between the nose cone 104 and the support ring 106, the insulating layer 110 at least partially comprising glass fibers.

A composite nose cone is also provided comprising an attachment region A, in which composite fibers are oriented substantially perpendicular to an axis of rotation of the nose cone 104, and an impact region I, in which composite fibers are oriented substantially parallel to the axis of rotation of the nose cone 104.

Also provided is a support ring 106 for a nose cone assembly, the support ring 106 comprising an annular main body 140 and an annular projecting attachment flange 142, the attachment flange 142 terminating in a plurality of circumferentially spaced attachment tabs 144, wherein the attachment flange 142 forms with the main body 140 a cross section having at least two C curves 160, 162.

16 Claims, 4 Drawing Sheets

(56) References Cited

U.S. PATENT DOCUMENTS

| | | | |
|---|---|---|---|
| 6,863,763 B2 * | 3/2005 | Lee et al. | 156/188 |
| 6,942,462 B2 * | 9/2005 | Breakwell et al. | 416/245 R |
| 7,094,033 B2 * | 8/2006 | Pauley et al. | 416/193 A |
| 7,182,518 B2 * | 2/2007 | Lee et al. | 384/206 |
| 7,473,035 B2 * | 1/2009 | Lee et al. | 384/208 |
| 2008/0022524 A1 | 1/2008 | Schreiber | |
| 2009/0214354 A1 * | 8/2009 | Bagnall | 416/245 R |
| 2010/0051112 A1 | 3/2010 | Dieling | |
| 2010/0215507 A1 * | 8/2010 | Breakwell | 416/244 A |
| 2010/0258199 A1 * | 10/2010 | Schreiber | 137/15.1 |

FOREIGN PATENT DOCUMENTS

| | | |
|---|---|---|
| EP | 2 221 247 A2 | 8/2010 |
| GB | 560613 | 4/1944 |
| GB | 2 363 170 A | 12/2001 |
| GB | 2 364 748 A | 2/2002 |

OTHER PUBLICATIONS

Feb. 20, 2012 Search Report issued in European Patent Application No. 11 18 8018.

* cited by examiner

NOSE CONE ASSEMBLY

BACKGROUND

A nose cone assembly is typically found at the intake of a gas turbine engine. The assembly conventionally comprises a one or two piece nose cone mounted on a support ring that is in turn fixed to the fan disk. The purpose of the nose cone assembly is to provide smooth inflow of air to the fan blades and to protect the rest of the engine from damage that could be caused by a foreign body impact such as a bird strike.

A typical two piece nose cone assembly 2 is illustrated in FIG. 1. The nose cone 4 comprises a woven glass fibre fabric pre-impregnated with an epoxy based resin and is manufactured using a hand lay-up technique. The thickness of the nose cone 4 and the cone angle are determined by the required impact behaviour. The thickness of the nose cone 4 is determined empirically based on impact test experience and increases with radius. The angle of the nose cone 4 is determined according to both impact behaviour and the necessity to avoid ice build up on the surface of the nose cone 4. The outer surfaces 6 of the nose cone 4 are coated with polyurethane for erosion resistance on top of an epoxy based paint, A white spiral is painted onto the nose cone 4. Typically, the nose cone 4 is radially located using a spigot fit 8 onto an aluminium support ring 10 and is axially located using a bolted flange 12 that mates with a corresponding flange 14 on the support ring 10. The nose cone 4 is a rotationally balanced component and is circumferentially timed using dowels. Any additional component balancing is achieved using steel putty. The second piece of the nose cone assembly is the fairing 16 that maintains the annulus line between the nose cone 4 and an adjacent annulus filler (not shown). The fairing 16 is typically made from the same composite material as the nose cone 4. Countersunk screws locate the fairing onto to discrete brackets 18 that are attached to the main nose cone support ring flange 14. The rear of the fairing 16 provides a support location for the leading edge of the annulus filler (not shown). The fairing 16 is painted and coated for erosion protection in the same manner as the nose cone 4. A leading edge seal is fixed to the nose cone 4 to prevent fairing vibration.

In the event of a foreign body impact, such as a bird strike, all of the impact forces are carried by the nose cone 4. Deflections into the support ring 10 could cause undesirable strains in the support ring and are thus minimised as far as possible. The connection between the nose cone 4 and the support ring 10 is highly rigid, ensuring any deflection caused in the nose cone 10 is limited to remain forward of the change in cone angle, illustrated at 20 in FIG. 1, and is not passed to the support ring 10.

In order to simplify the manufacturing process, attempts have been made to design one piece nose cone assemblies, such as for example those disclosed and illustrated in US2008/0022524 and U.S. Pat. No. 6,416,280. These one piece nose cones may be attached to the support ring by angled or pocketed screws that engage the support ring flange. However, in order to ensure the necessary rigidity in the connection between nose cone and support ring, such one piece designs require comparatively thick ring sections to impart the necessary stiffness. Particularly in a large nose cone assembly, such increased thickness carries a heavy weight penalty. In addition, manufacturing issues can arise with such thick sections in a composite material, including issues with inadequate wetting, induced thermal and cure shrinkage stresses, internal cracking and delamination. However, if the thickness of the attachment sections were reduced, then high deflections would be experienced within the nose cone and passed to the support ring. Following impact with a large bird, such deflections would be sufficiently high to raise concerns over excessive strains in the support ring that could lead to failure. It is therefore desirable to provide a lightweight nose cone assembly that is nonetheless highly impact resistant.

SUMMARY OF INVENTION

According to the present invention there is provided a nose cone assembly comprising a nose cone and a support ring, the nose cone is mounted on the support ring, the support ring comprises an annular main body and an annular projecting attachment flange, the attachment flange terminating in a plurality of circumferentially spaced attachment tabs, wherein the attachment flange forms with the main body a cross section having at least two C shaped curves, and the nose cone is mounted on the plurality of attachment tabs of the support ring.

The two C shaped curves may form an S shaped curve.

The attachment flange may comprise a locating shoulder.

At least one of the C shaped curves may be formed at a base region of the attachment tabs.

At least one of the C shaped curves may be formed at the projecting base of the attachment flange.

The nose cone may be a composite nose cone.

The composite nose cone may comprises an attachment region and an impact region, the composite fibres are oriented substantially perpendicular to an axis of rotation of the nose cone in the attachment region, and the composite fibres are oriented substantially parallel to the axis of rotation of the nose cone in the impact region, and the attachment region of the nose cone is mounted on the plurality of attachment tabs of the support ring.

The nose cone may be filament wound.

An insulating layer may be disposed between the nose cone and the support ring, the insulating layer at least partially comprising glass fibres.

The insulating layer may comprise an integral part of the nose cone.

The insulating layer may comprise a continuous annulus in the region of the nose cone at which it is mounted on the support ring.

The insulating layer may comprise a plurality of discrete insulating pads positioned at individual mounting locations.

The insulating layer may comprise at least one location feature for orienting the nose cone on the support ring.

The insulating layer may comprise a compression moulded component.

The insulating layer may be bolted to the nose cone or the insulating layer may be adhered to the nose cone using adhesive.

The present invention also provides a nose cone assembly comprising a nose cone, a support ring on which the nose cone is mounted, and an insulating layer disposed between the nose cone and the support ring, the insulating layer at least partially comprising glass fibres.

The insulating layer may be formed on an inner surface of the nose cone and may comprise an integral part of the nose cone. For example, the nose cone may be formed onto the insulating layer during a filament winding process.

The insulating layer may comprise a continuous annulus in the region of the nose cone at which it is mounted on the support ring.

The insulating layer may comprise a plurality of discrete insulating pads positioned at individual mounting locations.

The insulating layer may comprise at least one location feature for orienting the nose cone on the support ring. The location feature may for example comprise an annular ridge to be received on an annular shoulder of the support ring. The location feature may further comprise circumferential timing dowels.

By including location features for the nose cone in the insulating layer, the construction of the nose cone itself may be simplified. For example, a location ridge and timing dowels may be simply incorporated into a compression moulded insulating pad, enabling the nose cone to retain a relatively simple shell like structure. This simpler construction carries less risk of manufacturing defects caused by cure shrinkage and other related issues. Simplifying the structure of the nose cone also allows the nose cone to be manufactured using an automated technique, instead of the more expensive hand lay up techniques in conventional use.

The insulating layer may comprise a compression moulded component.

The insulating layer may be bolted to the nose cone. Alternatively, the insulating layer may comprise a thin surface layer and may be adhered onto the nose cone using adhesive such as an epoxy based adhesive.

According to another aspect of the present invention, there is provided a composite nose cone comprising an attachment region, in which composite fibres are oriented substantially perpendicular to an axis of rotation of the nose cone, and an impact region, in which composite fibres are oriented substantially parallel to the axis of rotation of the nose cone.

For the purposes of this invention, "substantially" may include up to 35 degrees of tolerance. The nose cane may be filament wound and may for example be formed from a 50/50 weight ratio of glass fibres and carbon fibres.

The nose cone of the present invention allows for the use of a range of materials, by optimising material properties for specific functions in discrete locations of the nose cone. By manipulating the fibre lay up, desirable material properties can be generated in specific locations for the nose cone, allowing the use of a greater range of fibre materials for the nose cone; Exemplary materials that may be considered include polyether ether ketone (PEEK) ™ and a fibre metal laminate system such as GLARE ™.

The attachment region of the nose cone may comprise the annular region in which it is mounted on a support ring. The impact region may include all parts of the nose cone that are forward of the attachment region when the nose cone is in an operational orientation.

According to another aspect of the present invention, there is provided a support ring for a nose cone assembly, the support ring comprising an annular main body and an annular projecting attachment flange, the attachment flange terminating in a plurality of circumferentially spaced attachment tabs, wherein the attachment flange forms with the main body a cross section having at least two C shaped curves.

The two C shaped curves may form an S shaped curve, which may for example be oriented substantially back to front.

The attachment flange may comprise an annular locating shoulder.

The locating shoulder may for example be suitable for interacting with an annular locating ridge for radial and axial location of a nose cone on the support ring.

At least one of the C curves may be formed at a base region of the attachment tabs.

At least one of the C curves may be formed at the projecting base of the attachment flange.

According to another aspect of the present invention, there is provided a nose cone assembly comprising a nose cone and a support ring, the nose cone is mounted on the support ring, the support ring comprises an annular main body and an annular projecting attachment flange, the attachment flange terminating in a plurality of circumferentially spaced attachment tabs, wherein the attachment flange forms with the main body a cross section having at least two C shaped curves, and the nose cone is mounted on the plurality of attachment tabs of the support ring.

The two C shaped curves may form an S shaped curve. The attachment flange may comprise a locating shoulder. At least one of the C shaped curves may be formed at a base region of the attachment tabs. At least one of the C shaped curves may be formed at the projecting base of the attachment flange.

According to another aspect of the present invention, there is provided a nose cone and a support ring, the nose cone is mounted on the support ring, the support ring comprises an annular main body and an annular projecting attachment flange, the attachment flange terminating in a plurality of circumferentially spaced attachment tabs, wherein the attachment flange forms with the main body a cross section having at least two C shaped curves, the nose cone is a composite nose cone, the composite nose cone comprises an attachment region and an impact region, the composite fibres are oriented substantially perpendicular to an axis of rotation of the nose cone in the attachment region, and the composite fibres are oriented substantially parallel to the axis of rotation of the nose cone in the impact region, and the attachment region of the nose cone is mounted on the plurality of attachment tabs of the support ring.

BRIEF DESCRIPTION OF DRAWINGS

For a better understanding of the present invention, and to show more clearly how it may be carried into effect, reference will now be made, by way of example, to the following drawings, in which.

DETAILED DESCRIPTION OF EMBODIMENTS

The current state of the art method of manufacture for a composite nose cone is by filament winding. A preferred material for filament winding the nose cone is 50/50 ratio by weight of S-2 Glass fibre, e.g. 449-AA-1250, 406 Tex (g/1000m) and Carbon fibre, e.g. HTA5131 6k with an epoxy resin system such as Hexcel ™ RTM6 resin. However, according to the present invention, other potential nose cone materials can be considered. The present invention calls for manipulating the fibre lay up of a composite nose cone, in order to achieve desired material properties at the relevant locations on the nose cone.

Figure 1:
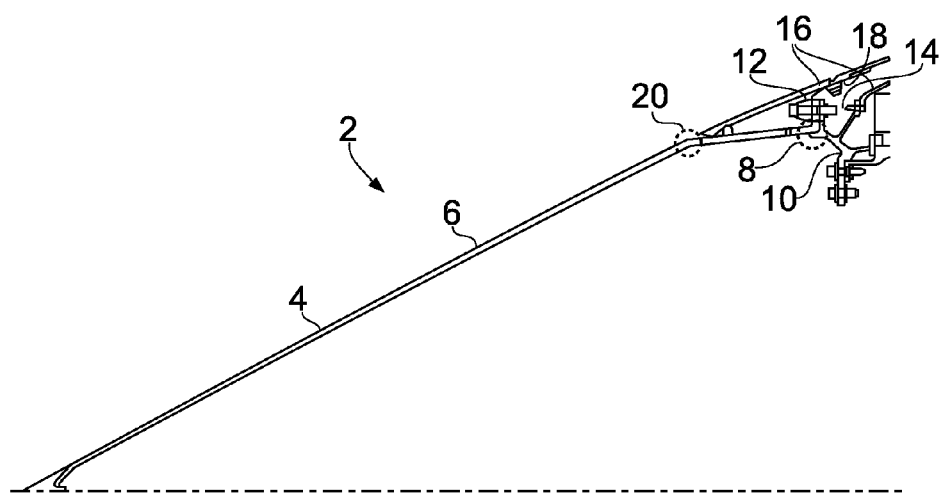
FIG. 1 is a sectional view of a nose cone assembly according to the prior art.
Figure 2:
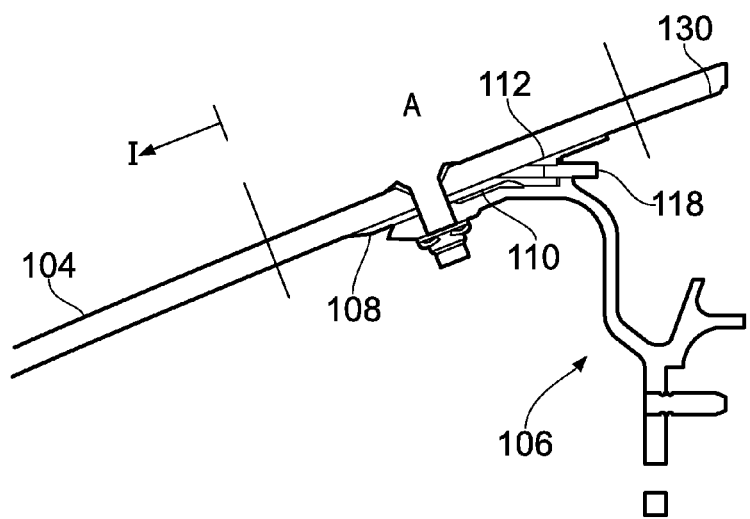
FIG. 2 is an enlarged partial sectional view of a nose cone assembly according to the present invention.

With reference to FIG. 2, a nose cone 104 of the present invention may be broadly divided into an attachment region A, being the annular region over which the nose cone 104 is mounted on a support ring 106, and an impact region I. The impact region I includes all parts of the nose cone 104 that are forward of the attachment region A with the nose cone in its operational orientation. Over the attachment region A, it is desirable for the nose cone to have high hoop stiffness, and associated good fatigue performance, particularly in the locations over the attachment region at which the nose cone is actually bolted to the support ring 106. Over the impact region I, the important material characteristic is the impact performance of the nose cone, and it is therefore desirable for the cone to efficiently distribute impact forces. According to the present invention, each of these properties is optimised over the relevant region through manipulation of the filament lay up during manufacture of the nose cone. Over the attachment region A, the fibres $F_1$ are oriented substantially perpendicular to the rotational axis of the nose cone, e.g. 70 degrees to 90 degrees, preferably 80 degrees, providing high hoop stiffness in this region. The high hoop stiffness has the effect of lowering the deflection that is passed to the support ring 106. Over the impact region I, the fibres $F_2$ are oriented more substantially parallel to the rotational axis of the nose cone, although in practice "parallel" will likely include a tolerance of up to 35 degrees, with the fibre lay up being predominantly oriented at between 5 and 35 degrees, preferably 5 and 30 degrees, to the rotational axis. The angle of orientation of the fibres changes gradually between the attachment region A and the impact region I.

The nose cone may be divided into a greater number of regions than merely attachment and impact regions, and the precise filament lay up may be manipulated in each region according to the desired material properties in each region. By optimising the material properties for function across the nose cone, a range of composite materials may be considered for the nose cone.

A PEEK ™ nosecone with continuous reinforcing fibres may be used, providing improved cone toughness and resistance to delamination, thus improving the impact performance of the cone.

A fibre metal laminate system such as GLARE ™ may also be used to provide improved resistance to large bird strike impacts.

For a low-cost nosecone, a long chopped fibre bulk moulding may also be considered. Such a moulding would have fibres of typically 2.5 cm (1") or greater in length in an epoxy matrix system. Possible materials include HexMC ™ from Hexcel ™, and MS-4A from YLA Composites. Such materials would allow for a compression moulding manufacturing method. In a further development of the invention, a hybrid carbon/glass epoxy pre-impregnated component may be utilised, which would provide the improved impact performance of hybrid systems in a pre-impregnated form.

The nose cone of the present invention is mounted on a support ring 106 to form a nose cone assembly. The support ring 106 may comprise an aluminium alloy, and the aluminium alloy may be anodised for corrosion protection, a titanium alloy or stainless steel. Further details of the support ring are discussed below, with reference to FIGS. 2 and 4 to 6.

Depending upon the material systems chosen for the nose cone 104 and support ring 106, it is possible that issues of galvanic corrosion may be experienced. Existing systems do not contemplate the use of a carbon fibre, or a composite cone with a large proportion of carbon fibre, with a material such as aluminium alloy. The present invention addresses this issue by providing a nose cone assembly having a nose cone 104, support ring 106 and an insulating layer 108. In a first embodiment, the insulating layer 108 comprises a layer of pure glass fibres, wound in a first stage of a filament winding manufacture process for the nose cone 104. Subsequent fibres for the main body of the nose cone are wound over the glass fibres and the complete filament wound preform is then moulded using resin infiltration, or infusion, such as Resin Transfer Moulding (RTM) or Vacuum Assisted Resin Transfer Moulding (VARTM).

In an alternative embodiment, a fabric tape may be wound onto a mandrel and the filaments for the body of the nose cone wound over the tape. The resulting preform is again RTM or VARTM moulded.

In another alternative embodiment, illustrated in FIG. 2, the insulating layer 108 may comprise a separate discrete component. The insulating layer may be manufactured from any composite process such as pre-impregnated manufacture, filament winding or compression moulding. An advantage of forming the insulating layer as a separate component is that such a construction allows the use of thermoplastic type materials. For example, PEEK ™, Polyether Imide (PEI) or Polyamide type materials may be used to form the insulating layer 108. According to the invention, the material options each comprise a glass reinforcement, such as a glass bead type reinforcement or a longer, chopped fibre type material. The possibility of compression moulding the insulating layer 108 allows for bulk and sheet moulding compounds to be used. Other material options include Lytex ™ or Cytec ™ materials.

According to one embodiment of the invention, the insulating layer comprises a complete annulus, located at the attachment region where the nose cone 104 is mounted on the support ring 106. However, in an alternative embodiment, illustrated in FIGS. 2 and 3, the insulating layer may comprise a plurality of discrete insulating pads 110, positioned at individual mounting locations for the nose cone 104. The insulating pads 110 may be bonded onto the surface of the nose cone 104 using an epoxy type adhesive, or the pads 110 may be bolted or riveted to the nose cone 104. Additional galvanic protection at the rear of the nose cone, in location 130, may be applied to the annulus filler (not shown) in the form of Vespel ™ or similar tape bonded into the lip.

Figure 3:
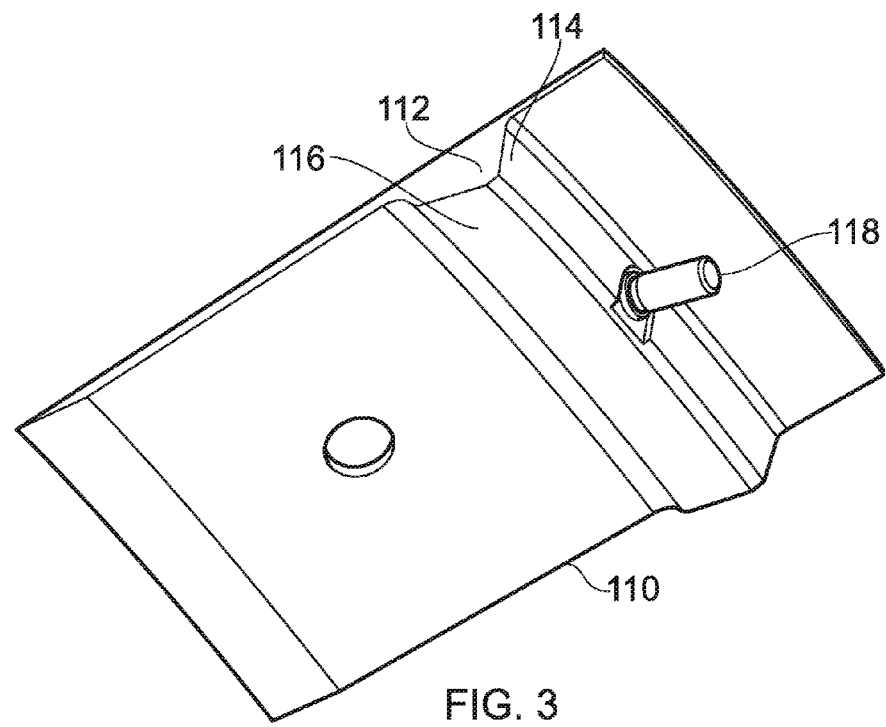
FIG. 3 is a perspective view of an insulating pad.

As illustrated particularly in FIG. 3, the insulating pads 110 comprise a plurality of locating features, including an annular ridge 112 having both radial 114 and axial 116 locating surfaces, and a circumferential timing dowel 118. The annular ridge and timing dowel engage with corresponding features on the support ring 106 to provide radial, axial and circumferential location of the nose cone 104 on the support ring 106. It is an advantage of the invention that these features may be included on the insulating pads 110, instead of being manufactured on the nose cone 104 itself. This transfer of features simplifies the construction of the nose cone 104, allowing for near constant section profile at the rear of the nose cone, and hence for automated manufacture, avoiding the need for expensive hand lay up. The use of insulating pads 110 also allows for modification of the locating features to optimise their function, without imposing unwanted constraints on nose cone manufacture. For example, the annular locating ridge may be larger than the conventional spigot fit on a standard nose cone. In addition, a clearance shoulder may be added to aid assembly and a longer timing dowel may be used.

A support ring 106 according to the present invention is illustrated in FIGS. 4A to 6. The support ring 106 is designed to allow deflection in both the nosecone 104 and support ring 106. However, the system is designed such that the strains generated from the deflections are lower than the plastic strain limit for the support ring 106 and the stress under all operating conditions is lower than the first ply failure strength and ultimate strength in the nose cone 104.

Figure 4A:
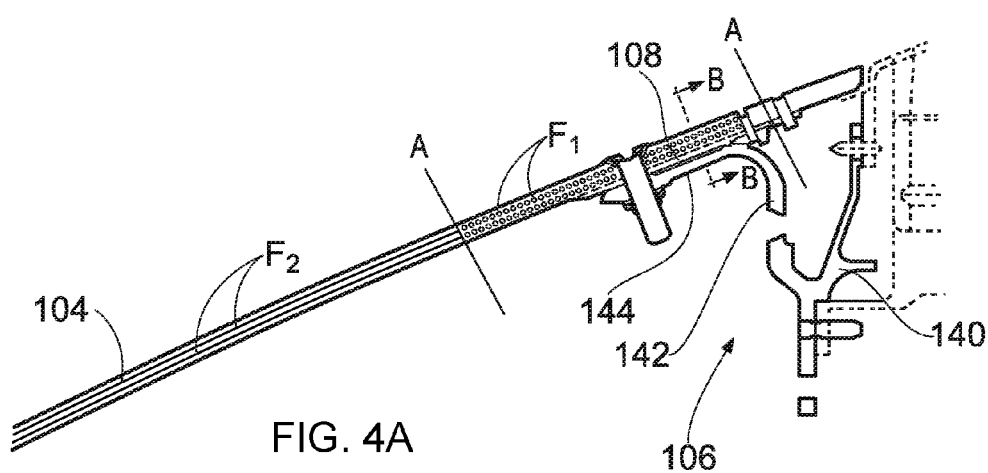
FIG. 4A is another part sectional view of a nose cone assembly.
Figure 4B:
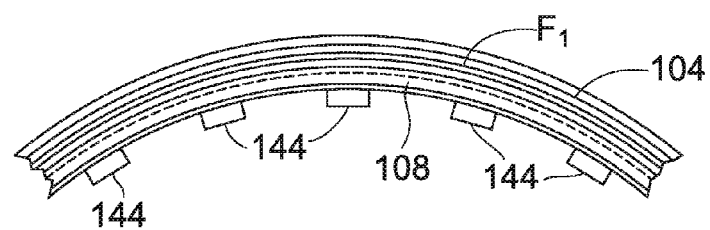
FIG. 4B illustrates a part cross-sectional view of an insulting layer of a nose cone assembly.
Figure 5:
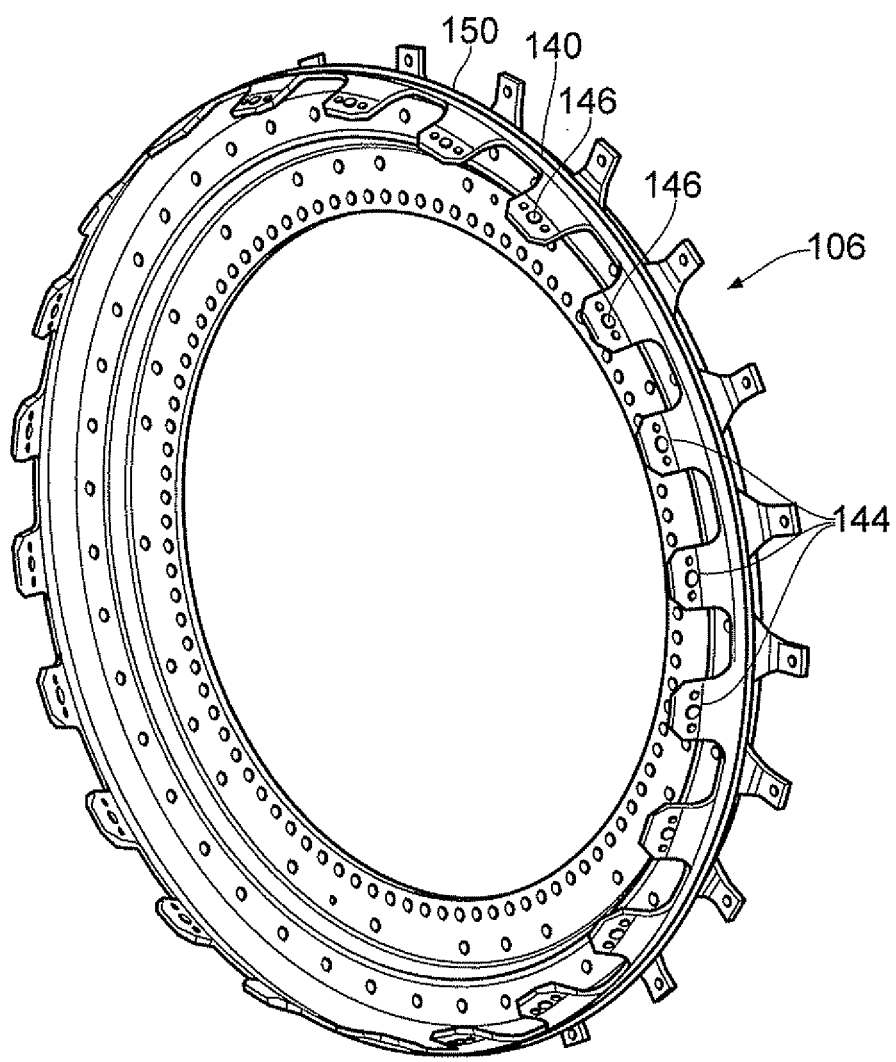
FIG. 5 is a perspective view of a support ring.
Figure 6:
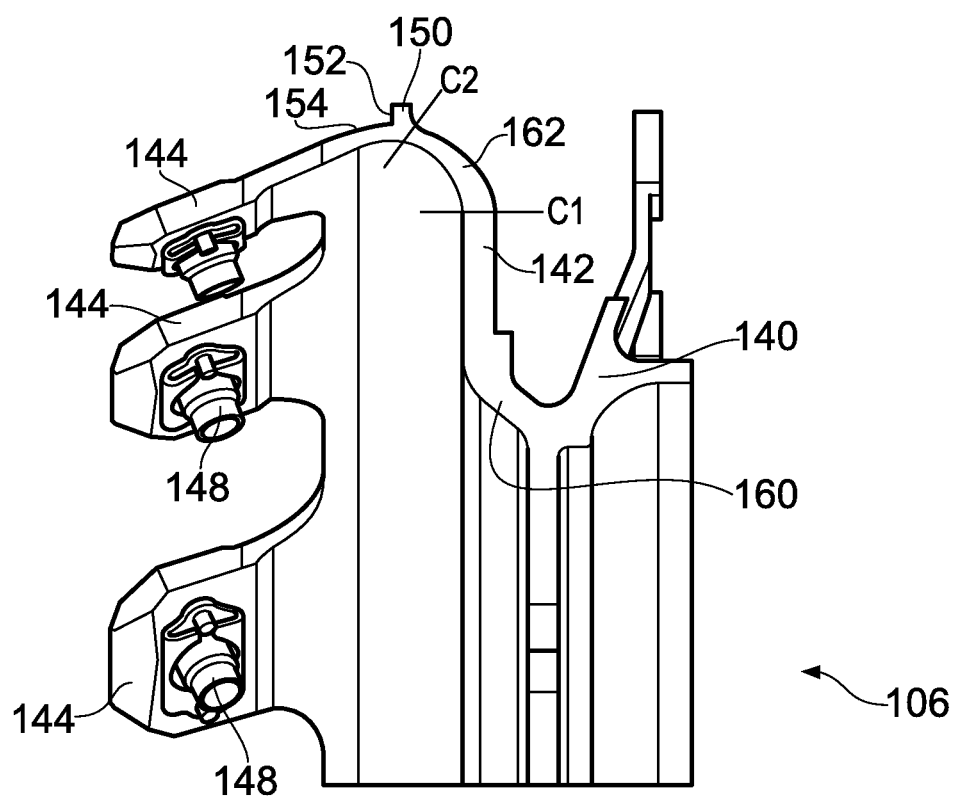
FIG. 6 is an enlarged partial perspective view of a support ring.

With reference to FIGS. 4A to 6, including FIG. 4B, the support ring 106 comprises an annular main body 140 and a projecting attachment flange 142 that terminates in a plurality of projecting attachment tabs 144. Each attachment tab 144 comprises an opening 146 extending through the attachment tab 144 in a radial direction. Each opening 146 is defined by a floating anchor nut 148 that is retained within the attachment tab 144. The projecting attachment flange 142 comprises an annular shoulder 150 that is defined by axial and radial location walls 152, 154. In use, the annular shoulder 150 engages the annular ridge 112 on the insulating pads 110 to provide radial and axial location of the nose cone 104 on the support ring 106. The nose cone 104 is held on the support ring 106 via a series of bolts that engage the nose cone 104 and insulating pads 110 and are received through the openings 146 in the attachment tabs 144. The floating anchor nuts 148 held in the attachment tabs 144 engage the bolts to hold the assembled components together.

In use, each attachment tab 144 may flex to a limited degree, but the nose cone 104 acts to operably connect each of the attachment tabs 144 together, so helping to distribute any load or deflection seen in any one attachment tab 144 amongst the other attachment tabs 144.

The projecting attachment flange 142 comprises two C shaped curves that together define an S shaped profile for the support ring. The first C shaped curve 160 is defined at the base of the attachment flange, in the region where the flange 142 initially projects from the main body 140. The second C shaped curve is defined at the base of the attachment tabs 144, where the attachment tabs 144 project from the remainder of the attachment flange 142. The thickness of the attachment flange in the region of the C shaped curves may be constant, or may taper. For example, the thickness of the attachment flange over the second C shaped curve 162 may taper from region C1 to region C2 in FIG. 6. The combined S shaped profile imparts a natural flexibility to the support ring 106, enabling the support ring 106 to withstand deflections and minimising strains seen in the support ring 106 for any particular impact load. By allowing the support ring to deflect over its S shaped profile, loads caused by a foreign object impact can be distributed within the nose cone 104 and attachment region of the support ring 106, allowing for rigid connection of the support ring main body 140 to the fan disk and annulus filler (not shown). Owing to the action of the S shaped attachment region, the rigid connections between the main body 140 of the support ring 106 and the adjacent engine components can be designed to withstand significantly minimised impact loads.

It will be appreciated that the improvements of the present invention provide a nose cone assembly that is lightweight and produced using a cost effective manufacturing process, but nonetheless highly impact worthy. Nose cone architecture is simplified, reducing manufacturing defects and allowing for cheaper, automated lay up. The provision of an insulating layer avoids galvanic corrosion problems in a high strength component and allows for greater material freedom in the design. The support ring is designed to act together with the nose cone to distribute impact forces, minimising strain levels in the support ring under impact and providing a light weight, high integrity design. The support ring may be formed from aluminium alloy without resorting to expensive heavier materials. The support ring may also be manufactured from a thermoplastic such as PEEK ™ or PPS or a thermoset composite such as epoxy/S2 Glass or Epoxy Carbon Fibre. The support ring may also be manufactured from titanium or stainless steel. If there are no galvanic corrosion problems then the need for an insulating layer is obviated and the nose cone may be mounted directly on the support ring or with the use of layer or pads.

The overall design of the nose cone of the present invention also affords no undesirable aerodynamic penalties.

The invention claimed is:

1. A nose cone assembly comprising:
  a nose cone having an apex; and
  a support ring, the support ring comprises:
    an annular main body; and
    an annular attachment flange projecting from the annular main body, the annular main body having a portion extending radially inwardly from a base of the annular attachment flange,
    the annular attachment flange terminating in a plurality of circumferentially spaced attachment tabs, wherein the annular attachment flange forms with the annular main body a cross-section having at least two C shaped curves,
    the annular attachment flange has a first portion extending radially and axially away from the annular main body towards the apex of the nose cone, the annular attachment flange has a second portion extending radially with respect to the annular main body, the annular attachment flange has a third portion extending radially and axially away from the annular main body towards the apex of the nose cone, wherein the annular attachment flange forms with the annular main body a cross-section having at least two C shaped curves, a first C shaped curve is formed between a radially inner end of the second portion of the annular attachment flange and the base of the annular attachment flange, a second C shaped curve is formed between a radially outer end of the second portion of the annular attachment flange and a base region of the attachment tabs, and
    wherein the nose cone is mounted on the plurality of attachment tabs of the support ring.

2. The nose cone assembly as claimed in claim 1, wherein the two C shaped curves form an S shaped curve.

3. The nose cone assembly as claimed in claim 1, wherein the attachment flange comprises a locating shoulder.

4. The nose cone assembly as claimed in claim 1, wherein the nose cone is a composite nose cone.

5. The nose cone assembly as claimed in claim 4, wherein the nose cone is filament wound.

6. The nose cone assembly as claimed in claim 4, comprising an insulating layer disposed between the nose cone and the support ring, the insulating layer at least partially comprising glass fibres, the insulating layer consists of glass fibres in a resin matrix.

7. The nose cone assembly as claimed in claim 6, wherein the insulating layer comprises an integral part of the nose cone.

8. The nose cone assembly as claimed in claim 6, wherein the insulating layer comprises a continuous annulus in the region of the nose cone at which it is mounted on the support ring.

9. The nose cone assembly as claimed in claim 6, wherein the insulating layer comprises a plurality of discrete insulating pads positioned at individual mounting locations.

10. The nose cone assembly as claimed in claim 6, wherein the insulating layer comprises at least one location feature for orienting the nose cone on the support ring.

11. The nose cone assembly as claimed in claim 6, wherein the insulating layer comprises a compression moulded component.

12. The nose cone assembly as claimed in claim 6, wherein the insulating layer is bolted to the nose cone.

13. The nose cone assembly as claimed in claim 6, wherein the insulating layer is adhered to the nose cone using adhesive.

14. The nose cone assembly as claimed in claim 4, wherein the composite nose cone comprising:
   an attachment region, wherein, in the attachment region, a majority of composite fibres are oriented substantially perpendicular to an axis of rotation of the nose cone; and
   an impact region, wherein, in the impact region, a majority of composite fibres are oriented substantially parallel to the axis of rotation of the nose cone.

15. The nose cone assembly as claimed in claim 1, wherein each attachment tab is flexible to a limited degree and the nose cone connects each of the attachment tabs together to distribute load or deflection occurring in any one of the attachment tabs amongst the other attachment tabs.

16. A nose cone assembly comprising:
   a nose cone having an apex; and
   a support ring, the support ring is generally Y-shaped in cross-section, the Y-shaped support ring comprises:
      three annular members integrally joined together at a junction and extending from the junction, a first annular member extending radially inwardly from the junction, a second annular member extending generally radially outwardly from the junction and a third annular member extending generally radially outwardly and generally axially away from the second annular member,
   the first annular member and the second annular member forming an annular main body and the third annular member forming an annular attachment flange projecting from the annular main body, the annular attachment flange terminating in a plurality of circumferentially spaced attachment tabs,
   the annular attachment flange has a first portion extending radially and axially away from the annular main body towards the apex of the nose cone, the annular attachment flange has a second portion extending radially with respect to the annular main body, the annular attachment flange has a third portion extending radially and axially away from the annular main body towards the apex of the nose cone, wherein the annular attachment flange forms with the annular main body a cross-section having at least two C shaped curves, a first C shaped curve is formed between a radially inner end of the second portion of the annular attachment flange and a base of the annular attachment flange, a second C shaped curve is formed between a radially outer end of the second portion of the annular attachment flange and a base region of the attachment tabs, and
   wherein the nose cone is mounted on the plurality of attachment tabs of the support ring.

\* \* \* \* \*